United States Patent [19]

Trepka et al.

[11] Patent Number: 5,384,349

[45] Date of Patent: Jan. 24, 1995

[54] CONJUGATED DIENE/MONOVINYLARENE COPOLYMERS AND PREPARATION THEREOF

[75] Inventors: William J. Trepka; Nathan E. Stacy; George A. Moczygemba, all of Bartlesville, Okla.

[73] Assignee: Phillips Petroleum Company, Bartlesville, Okla.

[21] Appl. No.: 163,966

[22] Filed: Dec. 6, 1993

[51] Int. Cl.$^6$ ............................ C08K 5/15; C08K 5/09; C08K 5/10; C08L 9/06
[52] U.S. Cl. .................................. 524/111; 524/317; 524/320; 524/321; 524/394; 524/575
[58] Field of Search ............... 524/111, 317, 320, 321, 524/394, 575

[56] References Cited

U.S. PATENT DOCUMENTS

| | | | |
|---|---|---|---|
| 5,013,773 | 5/1991 | Nomura et al. | 523/222 |
| 5,063,264 | 11/1991 | Nakajima | 524/394 |
| 5,292,789 | 3/1994 | Ishida et al. | 524/320 |

FOREIGN PATENT DOCUMENTS

| | | | |
|---|---|---|---|
| 0368283 | 5/1990 | European Pat. Off. | 524/320 |
| 0072750 | 6/1977 | Japan | 524/321 |

*Primary Examiner*—Peter Szekely
*Attorney, Agent, or Firm*—Marianne H. Michel

[57] ABSTRACT

A block copolymer comprising about 5 weight percent to about 95 weight percent monovinylarene monomer, about 95 to about 5 weight percent butadiene, and an effective amount of a thermal stabilizing agent selected from the group consisting of ascorbic acid, citric acid, disodium citrate, and mixtures thereof is provided. A process for stabilizing conjugated diene/monovinylarene block copolymer and articles prepared from such copolymers are also provided.

18 Claims, No Drawings

CONJUGATED DIENE/MONOVINYLARENE COPOLYMERS AND PREPARATION THEREOF

This invention relates to thermally stable conjugated diene/monovinylarene block copolymers.

BACKGROUND

Copolymers of conjugated diene/monovinylarene compounds are known and useful for a variety of purposes. Of particular interest are polymers that can withstand processing temperatures sufficient to be formed into articles, The polymers should exhibit sufficient thermal stability to be suitable for use with conventional molding equipment. Many applications for such articles involve food or beverage containers or intimate contact with food or beverages.

It would therefore be desirable to develop thermally stable conjugated diene/monovinylarene copolymers stabilized with additives "generally recognized as safe" by the Food and Drug Administration. Such polymers would thus be suitable for forming articles with conventional molding equipment.

SUMMARY OF THE INVENTION

An object of this invention is to provide conjugated diene/monovinylarene copolymers having good thermal stability.

Another object of this invention is to provide a process for stabilizing conjugated diene/monovinylarene copolymers with stabilizers that are generally recognized as safe in food products.

In accordance with this invention a thermally stable block copolymer comprising about 5 weight percent to about 95 weight percent monovinylarene monomer, about 95 to about 5 weight percent butadiene, and an effective amount of thermal stabilizing agent selected from the group consisting of ascorbic acid, citric acid, and disodium citrate, and mixtures thereof are provided.

In accordance with other aspects of this invention, an article prepared from the block copolymer and a process for preparing the block copolymer is provided.

DETAILED DESCRIPTION OF THE INVENTION

The conjugated diene/monovinylarene copolymers generally useful in this invention are prepared by a solution process involving sequential polymerization of monovinylarene monomers and conjugated diene monomers in the presence of an organomonoalkali metal initiator. Optionally, a monovinylarene monomer/conjugated diene monomer mixture can be polymerized to form a monovinylarene monomer/conjugated diene block. If desired, the polymer chains can be coupled.

The basic starting materials and polymerization conditions for preparing conjugated diene/monovinylarene copolymers are disclosed in U.S. Pat. Nos. 4,584,346; 4,704,434; 4,704,435; and 4,091,053.

Suitable conjugated dienes or mixtures thereof which can be used in this invention include those having 4 to 12 carbon atoms per molecule, with those having 4 to 8 carbon atoms preferred. Examples of such suitable compounds include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and the like. The preferred dienes are 1,3-butadiene and isoprene, most preferably 1,3-butadiene.

Suitable monovinylarene compounds or mixtures thereof which can be used in the copolymers include those having 8 to 18 carbon atoms per molecule, preferably 8 to 12 carbon atoms. Examples of such suitable compounds include styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)styrene, 1-vinylnaphthalene, 2-vinylnaphthalene, and the like. Styrene is the preferred monovinylarene compound.

The copolymer can be resinous, i.e. containing an amount of monovinylarene greater than 50 weight percent, or rubbery, containing an amount of conjugated diene greater than 50 weight percent. Generally the monovinylarene monomer is present in the final block copolymer in an amount in the range of from about 5 weight percent to about 95 weight percent based on the total weight of the final block copolymer, preferably in the range of from about 55 weight percent to about 95 weight percent, and more preferably in the range of from 60 weight percent to 90 weight percent.

Generally the conjugated diene monomer will be present in the final block copolymer in an amount in the range of from about 95 weight percent to about 5 weight percent based on the total weight of the final block copolymer, preferably in the range of from about 45 weight percent to about 5 weight percent, and more preferably in the range of from 40 weight percent to 10 weight percent.

The initiators can be any of the organomonoalkali metal compounds known for such purposes. Small amounts of polar organic compounds, such as ethers, thioethers, and tertiary amines can be employed in the hydrocarbon diluent to improve the effectiveness of the initiator and to randomize at least part of the monovinylarene monomer in a mixed monomer charge. The polymerization process is carried out in a hydrocarbon diluent at any suitable temperature in the range of from about −100° C. to about 150° C., preferably in the range of 0° to 110° C., at pressures sufficient to maintain the reaction mixture substantially in the liquid phase. After polymerization is complete, a coupling agent can be added. The copolymer composition can be recovered and worked into the desired shape, such as by milling, extrusion, or injection molding.

The stabilizing agent is selected from the group consisting of ascorbic acid, citric acid, and disodium citrate. Citric acid is preferred for preparing clear polymers, Ascorbic acid is preferred for preparing polymers when clarity is not important.

The stabilizing agent is employed in an amount effective to increase thermal stability. Generally the stabilizing agent will be present in the copolymer resin in an amount in the range of from about 50 parts by weight per million parts by weight (ppm) to about 2500 ppm based on the weight of the copolymer resin, preferably from about 100 ppm to about 1000 ppm, and more preferably from 100 ppm to 800 ppm.

The stabilizers can be added to the copolymer in any manner known using conventional mixing devices such as a roll mill, plastograph, extruder or the like. The stabilizers can also be added to the reaction mixture in solution after the solution copolymerization has been completed.

The copolymer composition can also contain other additives such as anti-oxidants, anti-blocking agents, release agents, fillers, extenders, dyes, vulcanizing agents, and accelerators, and the like as long as the amounts and types do no interfere with the objectives of this invention.

The following examples are presented to further illustrate the invention and are not meant to limit the scope thereby.

EXAMPLE I

The following example demonstrates the effectiveness of various gel suppressants to improve thermal stability of conjugated diene/monovinylarene copolymer.

Styrene/butadiene block copolymer as prepared employing a sequential solution polymerization and three initiators according to the process described in U.S. Pat. No. 4,584,346. Polymerization was allowed to continue to completion after each monomer charge. The sequence of styrene (S), butadine (B), initiator (i), and coupling agent (ca) charges was as follows: S, i, i, S, B, i, S, B, ca. Polymerization temperature ranged from about 38° to about 110° C. and pressure ranged from about 2 psig to about 60 psig. The weight ratio of styrene to butadiene in the styrene/butadiene block copolymer was 75/25. Following completion of the sequential polymerizations, Vikoflex 7170, (a coupling agent comprising epoxidized soybean oil sold by Viking Chemical Co.) was charged to the reactor. The styrene/butadiene block copolymers were stabilized with Irganox 1076 and tris(nonylphenyl) phosphite. The styrene/butadiene block copolymers exhibited melt flows in the range of from 5 g/10 min. to 15 g/10 min. measured according to ASTM D-1238, condition G. In the Table 1, ppm is parts by weight per million parts by weight based on the weight of the copolymer resin. Plastograph stability was measured employing a Brabender Plasticorder Model PL-V151 at 230° C. A 40 g sample was added to the preheated Plasticorder under a nitrogen atmosphere while mixing. After 10 minutes air was introduced and the time required to crosslink the polymers was indicated by an inflection in the torque vs. time curve, i.e. an increase in torque. Reproducibility was about +0.5 min. A plastograph stability of 30 minutes or higher was considered good. The results are summarized in Table 1.

TABLE 1

| Run | Additive | ppm | Clarity | Plastograph Stability (minutes) |
|---|---|---|---|---|
| 101 | none | 0 | clear | 25.4 |
| 102 | none | 0 | clear | 27.1 |
| 103 | Vitamin E | 100 | | 26.6 |
| 104 | | 200 | | 26.5 |
| 105 | | 500 | | 28.7 |
| 106 | Disodium Citrate | 100 | | 27 |
| 107 | | 200 | | 10.5 |
| 108 | | 500 | opaque | 37 |
| 109 | Citric Acid | 100 | clear | 32.5 |
| 110 | | 200 | clear | 34.0 |
| 111 | | 300 | clear | 33.2 |
| 112 | | 500 | clear | 33.8 |
| 113 | Ascorbic Acid | 100 | | 27.5 |
| 114 | | 200 | slight tint | 30 |
| 115 | | 500 | brown | 38 |

Table 1 demonstrates that disodium citrate, citric acid and ascorbic acid are effective thermal stabilizers which are generally considered safe by the Food and Drug Administration.

That which is claimed is:

1. A composition consisting essentially of a conjugated diene/monovinylarene block copolymer and an effective amount of a thermal stabilizing agent selected from the group consisting of ascorbic acid, citric acid, and disodium citrate, and mixtures thereof:
   wherein said monovinylarene contains from 8 to 18 carbon atoms and is present in an amount in the range of from about 5 weight percent to about 95 weight percent based on weight of the total copolymer; and
   wherein said conjugated diene contains from 4 to 12 carbon atoms and is present in an amount in the range of from about 95 weight percent to about 5 weight percent based on the weight of the total copolymer.

2. A composition according to claim 1 wherein said thermal stabilizing agent is present in an amount in the range of from about 50 parts by weight per million parts by weight (ppm) to about 2500 ppm based on the weight of the copolymer resin.

3. A composition according to claim 2 wherein said thermal stabilizing agent is present in an amount in the range of from about 100 ppm to about 1000 ppm.

4. A composition according to claim 3 wherein said thermal stabilizing agent is present in an amount in the range of from 100 ppm to 800 ppm.

5. A composition according to claim 1 wherein said conjugated diene contains from 4 to 8 carbon atoms.

6. A composition according to claim 5 wherein said conjugated diene is butadiene.

7. A composition according to claim 1 wherein said monovinylarene contains from 8 to 12 carbon atoms.

8. A composition according to claim 7 wherein said monovinylarene is styrene.

9. A composition according to claim 1 wherein said monovinylarene is present in an amount in the range of from about 55 weight percent to about 95 weight percent based on the weight of the total copolymer; and
   wherein said conjugated diene is present in an amount in the range of from about 45 weight percent to about 5 weight percent based on weight of the total copolymer.

10. A composition according to claim 9 wherein said monovinylarene is present in an amount in the range of from 60 weight percent to 90 weight percent based on the weight of the total copolymer; and
    wherein said conjugated diene is present in an amount in the range of from 40 weight percent to 10 weight percent based on weight of the total copolymer.

11. A composition according to claim 1 wherein said thermal stabilizing agent is citric acid.

12. A composition according to claim 1 wherein said thermal stabilizing agent is ascorbic acid.

13. A composition according to claim 1 wherein said thermal stabilizing agent is disodium citrate.

14. An article prepared from the composition of claim 1.

15. A composition consisting essentially of a butadiene/styrene block copolymer and an effective amount of a thermal stabilizing agent selected from the group consisting of ascorbic acid, citric acid, and disodium citrate, and mixtures thereof:
    wherein said styrene is present in an amount in the range of from about 55 weight percent to about 95 weight percent based on weight of the total copolymer; and
    wherein said butadiene is present in an amount in the range of from about 45 weight percent to about 5 weight percent based on the weight of the total copolymer.

16. A composition comprising a conjugated diene/monovinylarene block copolymer and an effective amount of ascorbic acid:
   wherein said conjugated diene contains from 4 to 12 carbon atoms and is present in an amount in the range of from about 5 weight percent to about 95 weight percent based on the weight of the total copolymer; and
   wherein said monovinylarene contains from 8 to 18 carbon atoms and is present in an amount in the range of from about 95 weight percent to about 5 weight percent based on weight of the total copolymer.

17. An article prepared from the composition of claim 16.

18. A process for stabilizing a conjugated diene/monovinylarene block copolymer comprising incorporating in said copolymer an effective amount of a thermal stabilizing agent selected from the group consisting of ascorbic acid, citric acid, and disodium citrate, and mixtures thereof.

* * * * *